3,063,824
METHOD OF COMBATTING WEEDS
Ralston Curtis, Los Altos, and George F. Probandt, Santa Clara, Calif., assignors to Stauffer Chemical Company, a corporation of Delaware
No Drawing. Filed Jan. 29, 1960, Ser. No. 5,375
1 Claim. (Cl. 71—2.7)

This invention relates in general to certain compounds which may be used as herbicides, fungicides and nematocides.

The compounds bis(2-chloroethyl)sulfone and bis (2-chloroethyl)sulfoxide, hereinafter referred to as T–100 and T–101, respectively, are known compounds. The compound T–100 is referred to at Beilstein 1, II, 353 and 1, III, 1388, and its preparation is described by Steinkopf, Herold & Stohr at Ber. 53, 1009 (1920). The compound T–101 is found at Beilstein 1, II, 354 and 1, III, 1388, and the preparation thereof is described by Steinkopf et al. in the article noted above.

It has now been found that these two compounds have some effectiveness as fungicides and nematocides and that they are particularly effective non-selective herbicides with both pre-emergence and post-emergence activity.

Various tests of the compounds have been conducted as follows:

The compounds T–100 and T–101 were tested against fungi; fungi are tested in vitro starting with 1 ounce bottles partially filled with a malt broth. The compound to be tested is mixed with the malt broth at any desired concentration (expressed in parts per million) and the bottles are inoculated with a spore suspension of the desired fungus. The bottles are then sealed and held for one week, after which time the results are examined and noted. The lowest concentrations which prevent growth are usually taken as definitive concentrations and are set out in Table A below:

TABLE A
*Fungicide in Vitro Test*

| Compound | Concentration (p.p.m.) Which Allowed No Fungus Growth | | |
|---|---|---|---|
| | Aspergillus niger | Botrytis cinera | Stemphylium sp. |
| T–100 | 25 | 10 | 10 |

In the foliage fungicide test, pinto bean plants are sprayed at 1000, 500, and 100 parts per million concentration of solvent dissolved or suspended chemical in water and wetting agent (Tween 20). One thousand parts per million is approximately half the commonly recommended field rate for commercial application. After drying, the beans are inoculated with bean rust, powdery mildew spores or northern corn leaf blight. Rust infection requires an overnight treatment in a mist chamber after inoculation. Results are read as 100 (no pustules or mildew), ++++ (75 to 100% control), +++ (50 to 75% control), ++ (25 to 50% control), and 0 (no visible control). Results are set forth in Table B below:

TABLE B
*Foliage Fungicide Test*

| Compound | Percent Control | | | | | | |
|---|---|---|---|---|---|---|---|
| | Bean Rust (Conc.) | | | Powdery Mildew | | | No. Corn Leaf Blight, 1,000 |
| | 1,000 | 500 | 100 | 1,000 | 500 | 100 | |
| T–100 | 75 | 0 | 0 | 75 | 25 | 0 | 50 |
| T–101 | 50 | 25 | 25 | 50 | 0 | 0 | 25 |

In the soil fungicide incorporation test, bean root rot complex is mixed with sterilized soil and then 1 pound portions are added to quart jars. A small depression is punched in this portion of soil and the hole is filled with coarse sand. One ml. of a 5% acetone solution of compound is pipetted into the sand and the jar is sealed. It is shaken thoroughly to mix the compound and sand throughout the soil. The treated soil then is dumped into a paper container, seeded with pinto beans and sealed with water. Bean infection is observed three or four weeks later. If no disease is present, a 100 rating is recorded. Ratings less than 100 represent percent control. Results are set forth in Table C below:

TABLE C
*Soil Fungicide Test*

| Compound | Bean Root Rot Complex (percent control) | |
|---|---|---|
| | 110 (p.p.m.) | 55 (p.p.m.) |
| T–100 | 100 | 100 |

In the soil nematocide test, the methods used are similar to those used for the soil fungicide test except that root knot nematodes are used up to the time that the soil compound mix remains in the sealed quart jar. It remains sealed for 48 hours and then is dumped into paper containers. Then the soil is allowed to stand in the greenhouse one week for airing after which a tomato plant is transplanted into it. The rot knot nematodes attack of the roots if they survive the chemical treatment, and cause swellings or knots. Three weeks later the plant is knocked out of the soil and the roots inspected. Nematode control is rated as in the soil fungicide incorporation test. Results with T–100 are set forth in Table D below:

TABLE D
*Soil Nematocide Test*

| Compound | Root Knot Nematode (percent control—110 p.p.m.) |
|---|---|
| T–100 | 100 |

The compounds in the present invention have been tested as herbicides and have been found very effective as the following tests show. In making the following test, seeds are planted in 3-inch pots and the plants allowed to emerge from the soil. Thereafter, the compound under test is applied to the pots as a drench at the rate of 75 pounds per acre. In another series of tests, the seeds are similarly planted and shortly thereafter the compound under test is applied to the pots as a drench at the rate of 250 pounds per acre. In both tests, the pots are placed in a greenhouse and watered at suitable intervals and the germination and/or growth of the seeds is compared with similarly planted seeds to which no herbicide is added. In the case of the pre-emergence drench tests, germination is reported on the scale of 0–100% while growth is reported on the scale of 0–10, based on the seeds which germinated. Thus, 100–10 indicates normal germination and normal growth. In the pre-emergence drench table, the left-hand column under each heading represents germination and the right-hand column represents growth. In the post-emergence spray table, the figures listed indicate growth only. See Tables E and F below:

TABLE E
*Post-Emergence Spray 75 Lbs./A.*

| Compound | Oats | Squash | Soybeans |
|---|---|---|---|
| T-100 | 7 | 0 | 0 |
| T-101 | 10 | 10 | 4 |

TABLE F
*Pre-Emergence Drench 250 Lbs./A.*

| Compound | Oats | | Cucumbers | | Radish | |
|---|---|---|---|---|---|---|
| T-100 | 0 | — | 0 | — | 0 | — |
| T-101 | 50 | 2 | 50 | 2 | 75 | 4 |

Pre-emergence tests of the afore-mentioned type are repeated using application rates of 10 and 40 pounds per acre, with results set forth in the Pre-Emergence Secondary Test as Table G below. The results are reported as before, with the left-hand column representing germination and the right-hand column representing growth.

TABLE G
*Pre-Emergence Secondary Test*

| Compound | Drench, Lb./A. | Peas | | Corn | | Radish | | Rye and Oats | |
|---|---|---|---|---|---|---|---|---|---|
| T-100 | 40 | 0 | — | 0 | — | 0 | — | 0 | — |
|  | 10 | 15 | 2 | 25 | 2 | 15 | 3 | 10 | 2 |
| T-101 | 40 | 15 | 0+ | 50 | 1 | 50 | 7 | 15 | 4 |
|  | 10 | 50 | 1 | 75 | 2 | 75 | 8 | 50 | 6 |

| Compound | Spray, Lb./A. | Wheat | | Wild Oats | | Soybeans | | Mustard | |
|---|---|---|---|---|---|---|---|---|---|
| T-100 | 10 | 40 | 3 | 10 | 2 | 0 | — | 0 | — |

Compounds of the present invention find particular utility as pre-emergence or post-emergence herbicides and may be applied in a variety of ways at various concentrations. They may be combined with suitable carriers and applied as dusts, sprays or drenches. The amount applied will depend upon the nature of the seeds or plants to be controlled and the rate of application may vary from one to 500 pounds per acre. One particularly advantageous way of applying the compounds is as a narrow band along a row crop, straddling the row.

Obviously, many modifications and variations may be made without departing from the spirit and scope of the invention, and therefore only such limitations should be imposed as are indicated in the appended claim.

We claim:
A method of combatting weeds comprising: applying to the soil a phytotoxic amount of the compound bis(2-chloroethyl)sulfone.

References Cited in the file of this patent
UNITED STATES PATENTS

| | | |
|---|---|---|
| 2,045,925 | Remy | June 30, 1936 |
| 2,624,666 | Kosmin et al. | Jan. 6, 1953 |
| 2,628,982 | James | Feb. 17, 1953 |
| 2,634,202 | Fincke | Apr. 7, 1953 |
| 2,654,667 | Goodhue | Oct. 6, 1953 |
| 2,858,341 | Dole | Oct. 28, 1958 |
| 2,959,517 | Bowers | Nov. 8, 1960 |

OTHER REFERENCES

Frear Catalogue of Insecticides and Fungicides, published by Chronica Botanica Co., vol. 1, page 58 (1947).

King: U.S. Department of Agriculture Handbook No. 69, May 1954, pages 5, 6 and 320.